Jan. 6, 1931.   H. BOUTILLON   1,788,186
METERING DEVICE CHIEFLY APPLICABLE TO APPARATUS
FOR THE DELIVERY OF LIQUIDS
Filed March 29, 1930   4 Sheets-Sheet 1
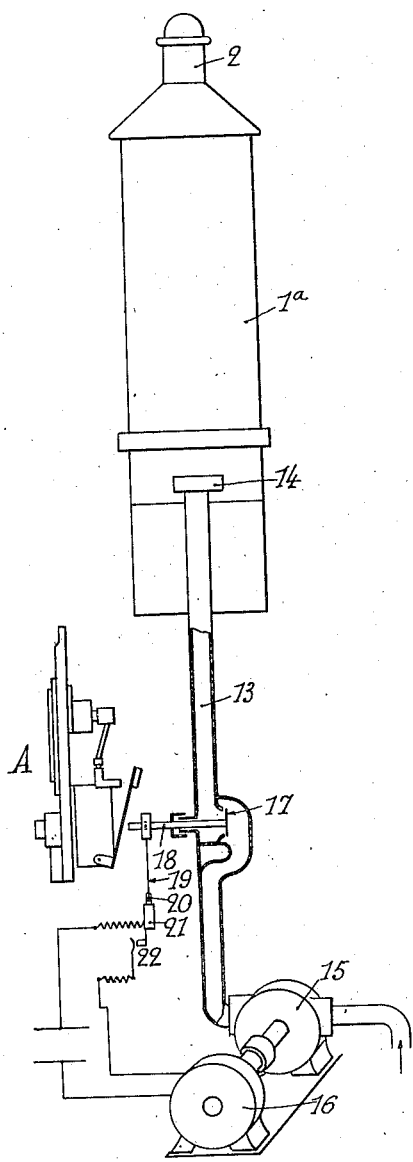
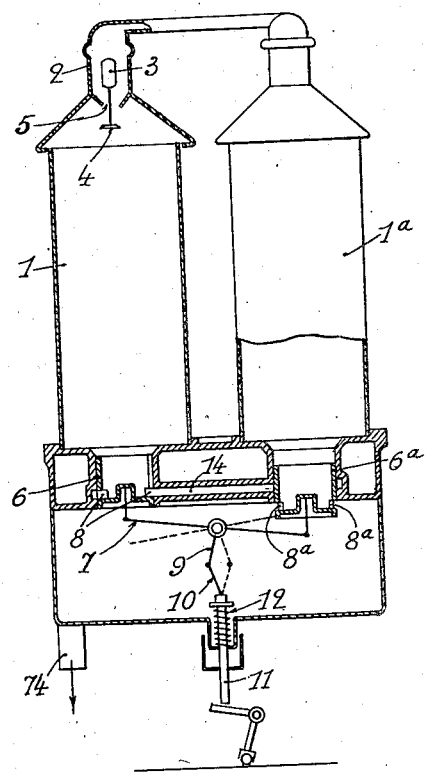
Henri Boutillon
INVENTOR;
By Otto Munk
his Attorney.

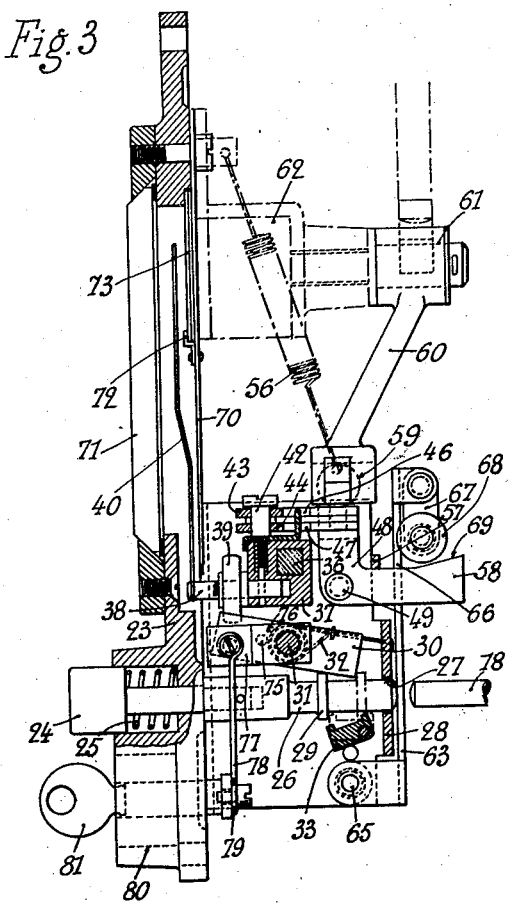

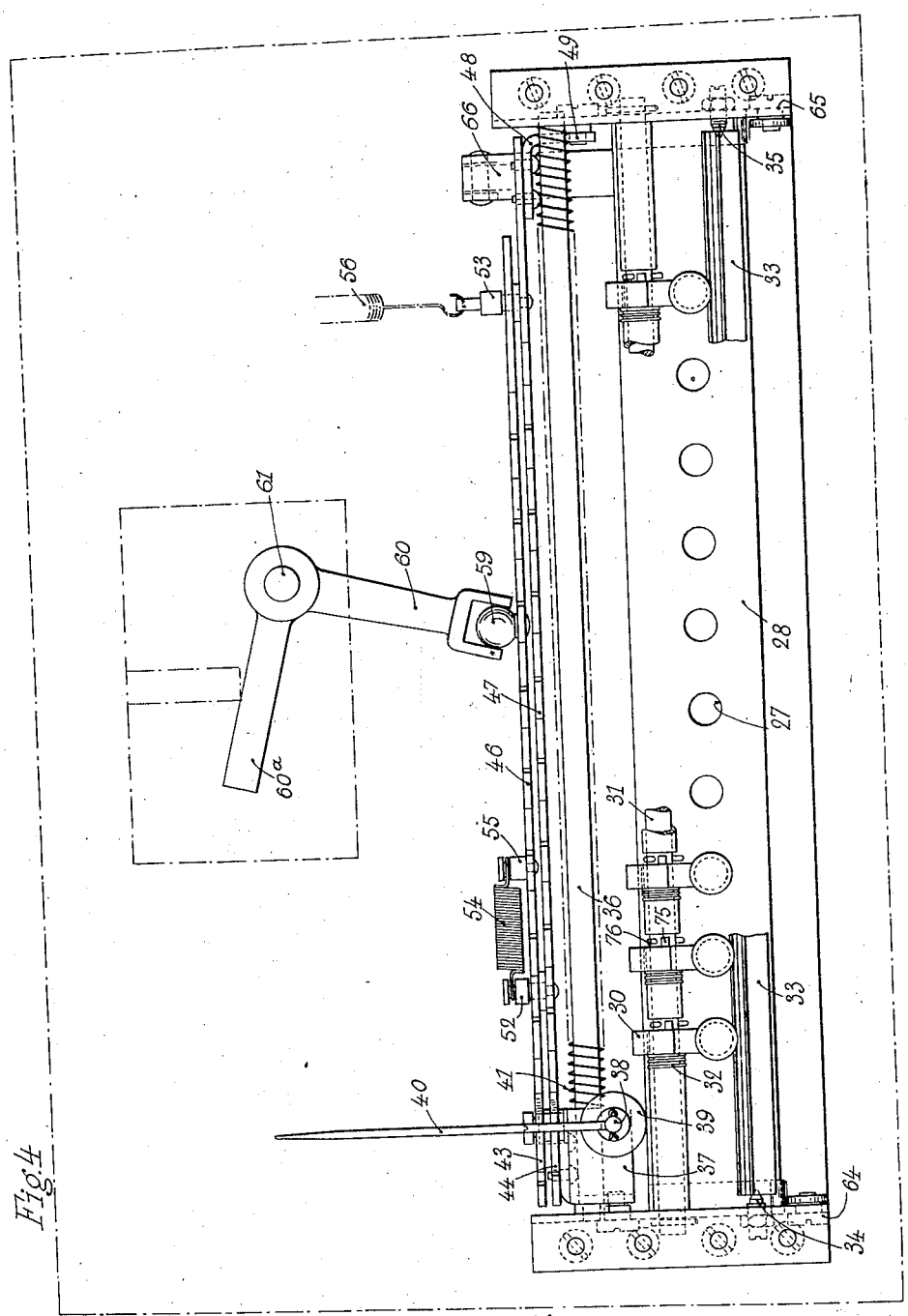

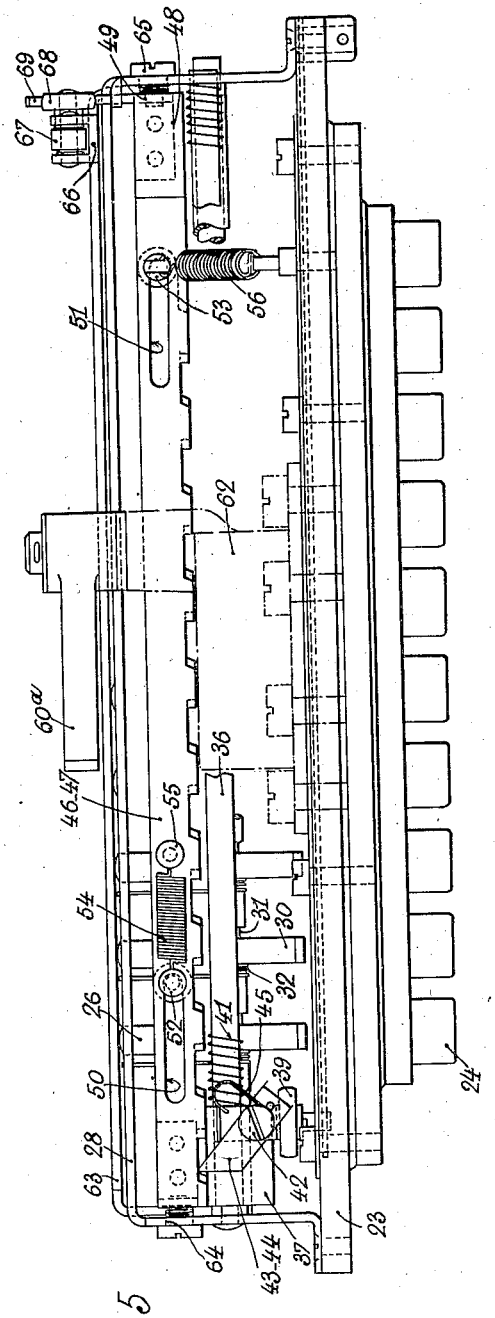

Patented Jan. 6, 1931

1,788,186

UNITED STATES PATENT OFFICE

HENRI BOUTILLON, OF SURESNES, FRANCE

METERING DEVICE CHIEFLY APPLICABLE TO APPARATUS FOR THE DELIVERY OF LIQUIDS

Application filed March 29, 1930, Serial No. 439,882, and in France April 4, 1929.

Apparatus for the delivery of measured quantities of liquids are in current use, which comprise one or preferably two measuring vessels adapted for alternate filling and emptying by means of suitable mechanism. The major part of such apparatus is provided with a meter actuated by the delivery device, in such manner that the meter is forwardly impelled through a unit distance, each time that a measuring vessel is emptied.

The present invention relates to an improved meter, chiefly applicable to apparatus for the delivery of liquids, and principally characterized by the fact that it comprises in combination an indicating pointer movable by successive impulses upon a rectilinear scale in such manner as to indicate the quantities of liquid which have been delivered, and also a set of push buttons, adjacent the respective figures of the scale, the apparatus being so constructed that the said pointer will stop in front of the button which has been pushed, and that the said button will at once return to the idle position when the actuated mechanism has been stopped.

According to other features of the invention, firstly, a fastening device prevents the use of any other push-button when one of the buttons has been pushed in and while the corresponding operation is taking place, and secondly, the pushing of a button causes the pointer to return automatically to zero, and hence it must necessarily start from the zero point.

Further characteristics of the invention will be specified in the following description.

In the accompanying drawings which are given solely by way of example:

Fig. 1 is a diagrammatic view showing the use of the said meter, the subject-matter of the invention, with an apparatus for the delivery of liquids.

Fig. 2 shows the delivery mechanism of said apparatus.

Fig. 3 shows a meter according to the invention, partly in cross-section and partly in side view.

Fig. 4 is a front view of the meter, with the main frame removed.

Fig. 5 is an external plan view.

For the better understanding of the object and the functioning of the said meter apparatus, the subject-matter of the invention, it is supposed to be in use, in Figs. 1 and 2 and solely by way of example, with an apparatus for delivering measured quantities of a liquid.

The said apparatus for the delivery of liquid comprises in the known manner two vessels 1 and 1a of standard capacity. Above each vessel is mounted a chamber 2 containing a float 3 connected to a clack valve 4 adapted to close the upper orifice 5 of the vessel when the said float is raised by the liquid.

At the bottom of the said vessels 1 and 1a are two respective pistons 6 and 6a which are connected to the respective ends of a pivoting arm 7 and are pierced with suitable ports 8—8a. On the said arm 7 is an appendage 9 to which is pivoted a link 10 urged at its other end by a push-piece provided with an upwardly acting spring 12.

The said vessels are supplied by a tank (not shown) through a pipe 13 leading to a conduit 14. On the said conduit is mounted a pump 15 which may be driven by an electric motor. Upon the pipe 13 is mounted a clack valve 17 whose stem 18, as will be further specified, is acted upon by the meter device A, the subject-matter of the invention, which is shown in full lines in Figure 1.

During its displacements, the rod 18 actuates the end of a lever 19 pivoted at 20. The other arm of said lever is provided with insulation at 21, and is adapted to make contact at 22, which starts an electric motor 16 driving the said pump 15.

Obviously, the contact at 22 need not control the circuit of the said motor, and it may simply control a relay, known per se, for the automatic starting of the motor, which may be situated at any distance.

In these conditions, and according to the construction herein represented, the meter apparatus, the subject-matter of the invention, is constituted as follows:

All parts of the said apparatus are mounted on a main frame having the form of a cut-out plate 23.

Various push-buttons 24 which may be provided in any number, for instance ten, are situated on the front part of the plate 23; each button is forwardly urged by a spring 25 (Fig. 3) and is extended at the rear by a rod 26 which is guided at its back end in a hole 27 formed in a plate 28 extending upon the whole length of the apparatus. On the said rod is provided a shoulder 29. Above each rod 26 is a rocking arm 30 pivotally mounted on an axle 31 common to all of the rocking arms, and each arm is urged into the position shown in Fig. 3 by a spring 32.

Below the rods 26 is a horizontal longitudinal bar 33 of U section whose branches or flanges are upwardly directed. Said bar is mounted at its ends on the respective tapered pivots 34—35, in such manner that when in the idle position it will be inclined as herein represented. By pushing a button 24, the shoulder 29 of the rod 26 will pass above the left hand flange of the U-shaped bar (Fig. 3) without making contact therewith, but it will then meet the right hand branch, thereby turning the said bar 33; the left hand flange thus rises and comes before the shoulders 29 of all the other buttons, and hence they cannot be pushed in, as represented by the dot-and-dash lines in Fig. 3; at the same time, the rocking arm 30, after it has been raised by the shoulder 29, will drop in the rear of the latter, thus preventing it from returning to the left of Fig. 1.

Above and parallel to the axle 31 is an axle 36 of square cross-section, on which is movable a slide 37 carrying an axle pin 38 upon which is rotatable a roller 39, and upon the said axle pin is mounted a pointer 40. A long and very flexible spring 41 surrounds the axle 36 and constantly urges the slide 37 to the left of Fig. 4. On the said slide is also mounted an axle 42 upon which are pivoted two superposed pawls 43—44, each controlled by a suitable spring such as 45 (Fig. 5).

Adjacent the said pawls are two corresponding racks 46—47 having the same number of teeth as there are push buttons 24. The lower rack 47 is secured at each end to a respective right-angled member 48 pivotally mounted on a horizontal axle 49. The upper rack 46 is movable lengthwise above the said rack 47, and for thus purpose it is pierced with two slots 50—51 for the insertion of respective studs 52—53 riveted to the rack 47. A spring 54 is attached at one end to the stud 52 and at the other end to a stud 55 riveted to the rack 46, and thus the spring 54 urges the rack 46 to the left of Fig. 4. To the stud 53 is attached a spring 56 which is secured at its other end to the said frame 23, thus urging both racks towards the left of Fig. 3, the position of the two racks being determined by a stop 57 (Fig. 3) cooperating with a projection 58 of the right-angled member 48.

To the rack 46 is riveted a ball-shaped member 59 cooperating with the forked end of a lever 60 keyed to a shaft 61 actuating the meter 62 for total amounts, which is mounted on the frame 23; said lever 60 receives the movements which are to be recorded by the said meter 62. The feeding element of a meter for the liquid may at each operation and by a suitable connection, bear upon the arm 60a of the lever 60 and then allow the latter to return to the idle position shown in Fig. 4. In the construction shown in Figs. 1 and 2, the element acting upon said lever 60 consists of the push-piece 11.

At the rear of the device consisting of the aforesaid elements is disposed a plate 63 extending upon the whole length of the meter and pivoted at 64 and 65 to the plate 28; said plate 63 carries an extension 66 to which is suspended a hanger or pendulum device 67 having at the end a roller 68 cooperating with an inclined plane 69 formed on the projection 58 of the right-angled member 48. Thus when the button 24 is pushed in, this will pivot, to the right of Figs. 1 and 3, the plate 63 at whose rear (Figs. 1 and 2) is situated the end of the stem 18 of the valve 17 supplying the two vessels 1 and 1a.

The apparatus according to the invention is completed by a dial 70 provided with a glass cover 71. Upon a slide 72 may be disposed one or more plates 73 carying all necessary indications, such as the price corresponding to each quantity delivered; such plates are removable, and can be simply slid into position from the outside of the apparatus.

The operation is as follows. It is commenced by pushing the button 24 situated below the number on the dial 70 corresponding to the quantity to be delivered, and this has several consequences. The shoulder 29 of the rod 26 corresponding to said button will pivot the bar 33 to the right, and thus places it in such position that none of the other buttons can be pushed. The shoulder 29 raises the corresponding rocking arm 30, which then descends at its rear, so that the said button cannot move back, and it thus remains in its pushed position.

At the same time the plate 63 turns to the right (Figs. 1 and 3), and during this movement, the roller 68 drives down the projection 58, and the device consisting of the two racks 46—47 thus turns to the right and is hence out of contact with the pawls 43—44. The slide 37, which was stopped in coincidence with a scale division of the dial as a result of a previous operation, will no longer be held by its pawls 43—44, and it is thus instantly brought back to its extreme left-hand position, as shown in Fig. 4. This position corresponds to the zero of the dial. As the plate 63 continues its movement to the right, the roller 68 escapes from the end of the projection 58 and ceases to act upon the latter. At this time, the rack device 46—47 will abruptly return to the position of Fig. 3, by pivoting on the axle 49 under the effect of said spring 56.

When pivoting to the right, the plate 63 drives out the stem 18, thus opening the valve 17 (or analogous element) whereby the apparatus delivering the liquid will be set in operation. At the same time, the lever 19 closes the circuit of the electric motor. The plate 63 is held in the inclined position by the rod 26 which is prevented from returning to the left since its shoulder 29 is in contact with the rocking arm 30.

The apparatus delivering the liquid will now operate. According to the example shown in Figs. 1 and 2, the liquid circulates through the pipe 13, the conduit 14, the ports 8 of the piston 6 and the hollow internal part of said piston, into the vessel 1. The air expelled by the rising liquid escapes through the upper orifice. During this time the liquid cannot enter the vesel 1a, as the imperforate part of the piston 6a obstructs the conduit 14. When the liquid rises to the level of the float 3, this latter will rise, and the valve 4 closes the orifice 5. Since the vessel 1 is closed and the pump 15 still operates, the pressure rises abruptly in the vessel 1 and becomes sufficient to lower the piston 6, and this turns the said pivoting arm 7. The appendage 9 and link 10 come into line, thus compressing the spring 12 and lowering the push-piece 11, thereby turning the said lever 60—60a, and as above stated, this will move the rack 46 by one tooth to the right of Figures 4 and 5.

The pawl 43 is also brought to the right, as well as the slide 37 and its pointer 40. The pawl 44 slides upon the lower rack 47 and drops into the next tooth space, but the appendage 9 and the link 10 still continue to move to the right, into the position shown in dotted lines in Fig. 2. The spring 12 expands during the second part of this movement, and the push-piece 11 rises. The piston 6 descends, and it assumes the position shown in Fig. 2 as concerns the piston 6a. In this position, it allows the liquid in the vessel 1 to flow out through the conduit 74.

When the push-piece 11 rises, the upper rack 46 returns to the rear, and the slide 37 remains in contact by its pawl 44 with the lower stationary rack 47. It has thus moved forward by one scale division. During the return movement of the rack 46, the pawl 43 slides upon the rack and thus drops into the succeeding tooth space, and thus a new alternate displacement of the rack 46 will move the slide 37 forward by another scale division.

In its movement of intermittent progression, occasioned by the alternate filling of the vessels 1—1a, the slide 37 moves successively above each of the push-buttons 24, and its roller 39 turns the corresponding rocking arms 30 about the axle 31.

When the slide 37 comes above the push-button 24 which has been driven in, the corresponding rocking arm 30 will be raised, thus releasing the shoulder 29 from the rod 26. The push-button 24 will thus abruptly return to the left of Fig. 3 under the action of its spring 25. The shoulder 29 acts upon the left hand flange of the bar 33 which is thus moved out of action and no longer prevents the pushing of the buttons 24. At the same time, the plate 63 returns to the left into the position shown in Fig. 3 when impelled by the stem 18, and the valve (or the like) connected to said stem will now close, thus stopping the action of the liquid delivery apparatus.

During the return movement of the plate 63, the roller 68 meets the projection 58, and the said hanging member 67 is thus raised, and hence the roller 68 moves above the said projection 58 without lowering the same, and finally reaches the position shown in Fig. 3. The pointer 40 thus stops adjacent the scale division corresponding to the push button which was pressed at the beginning of the operation; the said pointer will return to zero when another button is pushed in, or when the same button is pushed in order to provide for a succeeding operation of the apparatus, according to the aforesaid functioning.

The meter apparatus, the subject-matter of the invention, is preferably completed by a suitable device, known per se, whereby the whole mechanism can be returned to zero if for any reason the delivery is to be stopped before the quantity corresponding to the button 24 which has been pushed, has been delivered.

According to the preceding conditions, it is observed that, in order to return the whole apparatus to zero, it is simply necessary to raise the rocking arm 30 corresponding to the button 24 which has been pushed; in fact, the said rocking arm assures a continuous delivery of liquid by holding the said button in its pushed position.

In the apparatus herein specified, each rocking arm 30, pivoting on the axle 31, comprises a lateral stop 75 cooperating with a pin 76 mounted on the axle 31; to the said axle is keyed a member 77 (Fig. 3) connected by a link 78 to a crank 79 keyed to a barrel 80 which may be turned by a key 81.

The operation for the return to zero is thus very simple. The said key turns the barrel 80, and (by means of the aforesaid parts), the axle 31, in the counter-clockwise direction (Fig. 3). The pin 76 corresponding to the rocking arm which has been moved, will make contact with the stop 75 mounted on said rocking arm, and hence the arm will be brought into the normal position; since the rod 26 is now released, the push button 24 returns to the idle position. The plate 63 is also released, and will thus rise, and the delivery of the liquid ceases.

The said meter apparatus, the subject-matter of the invention, offers numerous advantages. The reading is effected with great facility, due to the rectilinear scale, and since there is only a single graduated scale to be observed, this scale serving both for a predetermining meter and for the recording of each operation as it takes place. The pointer further indicates the quantities and their value, by the use of the plates which may be placed in the slide 72. The apparatus is very simple in its operation, as it is only necessary to push the button corresponding to the desired quantity. After each operation, the pointer remains in coincidence with the mark representing the desired quantity, thus showing the nature of the operation. The pointer is brought automatically and necessarily to the zero point at the start of each operation, and thus the accuracy of the metering is assured. After a button has been pushed and an operation thus commenced, it will be impossible to push another button until the said operation has been completed.

Obviously, the invention is not limited to the form of construction herein described and represented, which is given solely by way of example. Furthermore, the said meter apparatus may be employed for all desired metering operations aside from the operations of emptying a device for the delivery of liquid.

Having now described my invention, what I claim as new and desire to secure by Letters Patent is:

1. In combination with a delivering apparatus adapted to automatically repeat a given operation after having been set in operation, a metering and controlling device which comprises an indicating member movable along a scale, means whereby said member will be given a step-by-step motion in response to the performance of each operation, a set of keys adapted to be separately actuated at will, each associated with a corresponding graduation on the scale, control means adapted to allow the material to be delivered in response to the actuation of any one of said keys and means whereby the movable indicating member having come in register with the scale graduation associated with the actuated key, will cause said control means to cut off the delivery.

2. In an apparatus as claimed in claim 1, the provision of means whereby the actuation of any one of said keys will cause all the other keys to be locked until the indicating member has come in register with the scale graduation associated with the actuated key.

3. In an apparatus as claimed in claim 1, the provision of power means adapted to actuate said apparatus and of means by which the actuation of any one of said keys will start the apparatus.

4. In an apparatus as claimed in claim 1, the provision of power means adapted to actuate said apparatus, of means by which the actuation of any one of said keys will start the apparatus and of means adapted to stop said apparatus upon said indicating member has come in register with the scale graduation associated with the actuated key.

5. In combination with a delivering apparatus adapted to automatically repeat a given operation after having been set in operation, a metering and controlling device which comprises an indicating member movable along a rectilinear scale, means whereby said member will be given a step-by-step rectilinear motion in response to the performance of each operation, a set of keys put in line parallel to the scale and adapted to be separately actuated at will, each associated with a corresponding graduation on the scale, control means adapted to allow the material to be delivered in response to the actuation of any one of said keys, and means whereby the movable indicating member having come in register with the scale graduation associated with the actuated key, will cause said control means to cut off the delivery.

6. In combination with a delivering apparatus, adapted to automatically repeat a given operation after having been set in operation, a metering and controlling device which comprises an indicating member movable along a scale, means whereby said member will be given a step-by-step motion in response to the performance of each operation, a set of keys adapted to be separately actuated at will, each associated with a corresponding graduation on the scale, resilient means permanently and separately urging said keys in their inoperative position, control means adapted to allow the material to be delivered in response to the actuation of any one of said keys into its operative position and to cut off the delivery upon the key being moved back to its inoperative position, a number of separate members, each associated with a corresponding key and adapted to automatically lock said key upon actuation of the latter into its operative position, each of said locking members being arranged to be brought into an unlocking position by a member taking part to the travel of said indicating member when the latter has come into register with the scale graduation associated with the corresponding key.

7. In an apparatus as claimed in claim 6, the provision of a movable locking member adapted to be displaced in response to the displacement of any one of said keys being actuated, thereby locking all the other keys against actuation until the actuated key has returned into its inoperative position.

8. In combination with a delivering apparatus adapted to automatically repeat a given operation after having been set in operation, a metering and controlling device which comprises an indicating member movable along a scale, means whereby said member will be given a step-by-step motion in response to the performance of each operation, a set of self-locking keys adapted to be separately actuated at will, each associated with a corresponding graduation on the scale, so that any one of said keys when actuated will remain in the position into which it has been brought, control means adapted to allow the material to be delivered in response to the actuation of any one of said keys, and means adapted to be set in operation by the motion of said indicating member for causing the actuated key to be brought to its inoperative position upon said indicating member has come in register with the scale graduation associated with said actuated key, whereby said control means will cut off the delivery.

9. In an apparatus as claimed in claim 1, the provision of means for stopping the indicating member when in register with the scale graduation associated with the actuated key and locking it in said position and of means adapted to urge back said indicating member to its initial or starting position in response to the actuation of any one of said keys.

10. In an apparatus as claimed in claim 1, the further feature residing in that said indicating member and its driving arrangement comprise a pointer carried by a slide, means for supporting and guiding said slide, a set of two pawls pivotally carried by said slide and arranged to cooperate in contrary direction each with a corresponding rack, one of said racks being stationary and the other movable, means adapted to impart a motion of translation to the movable rack in response to the performance of each operation, resilient means for urging back said movable rack and means whereby the racks and pawls may be brought out of operative engagement, whereby the slide may be returned to its initial position.

11. In an apparatus as claimed in claim 1, the further feature residing in that said indicating member and its driving arrangement comprise a pointer carried by a slide, means for supporting and guiding said slide, a set of two pawls pivotally carried by said slide and arranged to cooperate in contrary directions each with a corresponding rack, one of said racks being stationary and the other movable, means adapted to impart a motion of translation to the movable rack in response to the performance of each operation, resilient means for urging back said movable rack, both racks being supported by a swinging bracket and resilient means for urging said bracket to a position in which pawls and racks are in operative engagement.

12. In an apparatus as claimed in claim 1, the further feature residing in that said indicating member and its driving arrangement comprise a pointer carried by a slide, means for supporting and guiding said slide, a set of two pawls pivotally carried by said slide and arranged to cooperate in contrary directions each with a corresponding rack, one of said racks being stationary and the other movable, means adapted to impart a motion of translation to the movable rack in response to the performance of each operation, resilient means for urging back said movable rack, means whereby the racks and pawls may be brought out of operative engagement, and a spring permanently urging back said slide, whereby the latter will be automatically returned to its initial position upon disengagement of the pawls and racks.

13. In an apparatus as claimed in claim 1, the further feature residing in that said indicating member and its driving arrangement comprise a pointer carried by a slide, means for supporting and guiding said slide, a set of two pawls pivotally carried by said slide and arranged to cooperate in contrary directions each with a corresponding rack, one of said racks being stationary and the other movable, means adapted to impart a motion of translation to the movable rack in response to the performance of each operation, resilient means for urging back said movable rack, both racks being supported by a swinging bracket, resilient means for urging said bracket to a position in which pawls and racks are in operative engagement, means responsive to the actuation of any one of the keys and adapted to urge back said bracket to momentarily bring the racks out of engagement with the pawls, and a spring permanently urging back the slide.

14. In an apparatus as claimed in claim 1, the further feature residing in that said indicating member and its driving arrangement comprise a pointer carried by a slide, means for supporting and guiding said slide, a set of two pawls pivotally carried by said slide and arranged to cooperate in contrary directions each with a corresponding rack, one of said racks being stationary and the other movable, means adapted to impart a motion of translation to the movable rack in response to the performance of each operation, resilient means for urging back said movable rack, both racks being supported by a swinging bracket, resilient means for urging said bracket to a position in which pawls and racks are in operative engagement, a swinging support adapted to be urged by any one of said keys and carrying a pendulum, means for preventing the pendulum from swinging in one direction, said pendulum being further adapted to engage said swinging bracket in order to urge the latter against said resilient means and to disengage the same for a predetermined angular stroke of the bracket by which the racks and pawls are brought out of operative engagement, a spring permanently urging back the slide and means for swinging back said support to its initial position after the slide has come back to the zero position.

15. In an apparatus as claimed in claim 1, the provision of means adapted to be actuated at will for cutting off the delivery before the slide has come in register with the scale graduation associated with the actuated key.

16. In an apparatus as claimed in claim 6, the provision of means actuatable at will and adapted to act upon said locking members to bring them into inoperative position, whereby the actuated key will be released and the delivery cut off before the slide has come in register with the scale graduation associated with the actuated key.

In testimony whereof I have signed my name to this specification.

HENRI BOUTILLON.